United States Patent
Chan et al.

(10) Patent No.: US 11,611,409 B2
(45) Date of Patent: Mar. 21, 2023

(54) COMMUNICATION SYSTEM AND COMMUNICATION METHOD FOR REPORTING COMPROMISED STATE IN ONE-WAY TRANSMISSION

(71) Applicant: BlackBear (Taiwan) Industrial Networking Security Ltd., Hsinchu (TW)

(72) Inventors: Yuan Chen Chan, Hsinchu (TW); Po-Chih Hsu, Changhua County (TW)

(73) Assignee: BlackBear (Taiwan) Industrial Networking Security Ltd., Hsinchu (TW)

(*) Notice: Subject to any disclaimer, the term of this patent is extended or adjusted under 35 U.S.C. 154(b) by 0 days.

(21) Appl. No.: 17/465,819

(22) Filed: Sep. 2, 2021

(65) Prior Publication Data

US 2022/0399957 A1  Dec. 15, 2022

Related U.S. Application Data (60) Provisional application No. 63/210,480, filed on Jun. 14, 2021.

(51) Int. Cl.
*H04L 1/00* (2006.01)
*H04L 9/40* (2022.01)

(52) U.S. Cl.
CPC .......... *H04L 1/0091* (2013.01); *H04L 1/0072* (2013.01); *H04L 1/0089* (2013.01); *H04L 63/0435* (2013.01)

(58) Field of Classification Search
CPC ... H04L 1/0091; H04L 1/0072; H04L 1/0089; H04L 63/0435

(Continued)

(56) References Cited

U.S. PATENT DOCUMENTS 5,703,562 A   12/1997   Nilsen
7,649,452 B2   1/2010   Zilberstein et al.
(Continued)

FOREIGN PATENT DOCUMENTS

EP   3611899   2/2020
GB   2559431   8/2018
(Continued)

OTHER PUBLICATIONS

"Search Report of Europe Counterpart Application", dated Feb. 18, 2022, p. 1-p. 7.

(Continued)

*Primary Examiner* — Kyle Vallecillo
*Assistant Examiner* — Osman M Alshack
(74) *Attorney, Agent, or Firm* — JCIPRNET (57) ABSTRACT

A communication system and a communication method for reporting a compromised state in one-way transmission are provided. The communication method includes: receiving a packet by a first port; coupling an error checking circuit to the first port, wherein the error checking circuit checks a header of the packet; coupling a first unidirectional coupler to the first port and the error checking circuit, and coupling a second unidirectional coupler to the first port and the error checking circuit; in response to an error being in the header, disabling the first unidirectional coupler and the data inspection circuit and enabling the second unidirectional coupler by the error checking circuit; receiving the packet from the communication device by a receiving server; and in response to determining the received packet is incomplete by the receiving server, outputting the compromised state by the receiving server.

13 Claims, 4 Drawing Sheets

(58) Field of Classification Search
USPC .................................................. 714/748–750
See application file for complete search history.

(56) References Cited

U.S. PATENT DOCUMENTS

| | | | |
|---|---|---|---|
| 8,250,235 B2 | 8/2012 | Harvey et al. | |
| 8,250,358 B2 | 8/2012 | Cheng | |
| 8,352,450 B1 | 1/2013 | Mraz et al. | |
| 8,353,022 B1 | 1/2013 | Menoher et al. | |
| 8,732,453 B2 | 5/2014 | Mraz et al. | |
| 8,776,254 B1 | 7/2014 | Mraz et al. | |
| 8,891,546 B1* | 11/2014 | Frenkel | H04L 63/0254 370/282 |
| 8,893,253 B2 | 11/2014 | Cianfrocca | |
| 9,088,539 B2 | 7/2015 | Mraz | |
| 9,088,558 B2 | 7/2015 | Curry et al. | |
| 9,306,953 B2 | 4/2016 | Mraz et al. | |
| 9,521,120 B2 | 12/2016 | Ferry | |
| 9,584,521 B2 | 2/2017 | Frenkel | |
| 9,729,507 B2 | 8/2017 | Fischer et al. | |
| 9,736,121 B2 | 8/2017 | Mraz et al. | |
| 9,749,011 B2 | 8/2017 | Kim et al. | |
| 9,762,536 B2 | 9/2017 | Frenkel et al. | |
| 9,847,972 B2 | 12/2017 | Frenkel et al. | |
| 9,853,918 B2 | 12/2017 | Mraz et al. | |
| 10,218,715 B2 | 2/2019 | Thomson et al. | |
| 10,990,737 B2 | 4/2021 | Staubly et al. | |
| 2003/0224801 A1* | 12/2003 | Lovberg | H04B 10/40 455/454 |
| 2006/0005243 A1* | 1/2006 | Norton | H04W 12/08 726/23 |
| 2008/0205891 A1* | 8/2008 | Xiao | H04J 3/1611 398/98 |
| 2009/0002150 A1* | 1/2009 | Zilberstein | G05B 23/0208 340/531 |
| 2012/0099474 A1* | 4/2012 | Gauthier | H04B 7/0808 370/252 |
| 2013/0010954 A1 | 1/2013 | Falk et al. | |
| 2014/0112215 A1* | 4/2014 | Hasegawa | H04W 72/085 370/280 |
| 2016/0080033 A1* | 3/2016 | Kim | H04L 63/1425 375/220 |
| 2017/0118123 A1* | 4/2017 | Ishii | H04L 63/20 |
| 2017/0150464 A1* | 5/2017 | Kazehaya | H04J 3/0641 |
| 2017/0353368 A1 | 12/2017 | Blocher et al. | |
| 2020/0053048 A1* | 2/2020 | Frenkel | H04L 63/18 |
| 2020/0120071 A1 | 4/2020 | Wimmer et al. | |
| 2020/0177292 A1* | 6/2020 | Abdelmonem | H04L 25/08 |
| 2020/0259585 A1 | 8/2020 | Aust et al. | |
| 2020/0275305 A1* | 8/2020 | Huang-Fu | H04W 80/10 |
| 2021/0288978 A1* | 9/2021 | Harrison | H04L 63/1416 |
| 2022/0029959 A1* | 1/2022 | Frenkel | H04L 63/0209 |

FOREIGN PATENT DOCUMENTS

| | | |
|---|---|---|
| TW | I719836 | 2/2021 |
| TW | I724798 | 4/2021 |

OTHER PUBLICATIONS

"Notice of allowance of Taiwan Counterpart Application", dated Mar. 9, 2022, p. 1-p. 4.

* cited by examiner

COMMUNICATION SYSTEM AND COMMUNICATION METHOD FOR REPORTING COMPROMISED STATE IN ONE-WAY TRANSMISSION

CROSS-REFERENCE TO RELATED APPLICATION

This application claims the priority benefit of U.S. provisional application Ser. No. 63/210,480, filed on Jun. 14, 2021. The entirety of the above-mentioned patent application is hereby incorporated by reference herein and made a part of this specification.

BACKGROUND

Technical Field

The disclosure is directed to a communication system and a communication method for reporting a compromised state in one-way transmission.

Description of Related Art

Using one-way link for securely transmitting data from a secure site (or OT site: operation technology site) to an insecure site (or IT site: information technology site) is a secured way to guarantee the protection of the secure site from any access via an insecure site. The "one-way" link is generally referred a communication link that is physically configured to transmit signals in one direction, wherein the communication link is incapable of transmitting signals in another direction. However, the secure site is not always safe. For example, a device in the secure site may be attacked during the maintenance period when the firmware of the device is upgraded. The transmitting server in secure site may also be attacked. In the traditional one-way mechanism, such as unidirectional fiber, the attack cannot be reported. However, if a FPGA with content inspection rule is applied in the one-way link transmission, those data packets which are malicious or not supposed to be transmitted will be dropped. With content inspection checking, data should be implemented in transmitting server in software based. Once packets are dropped by FPGA rules, a compromised state may be generated in secure site or the dropped packet is required to be analyzed. Some prior arts propose a way to filter the data flow from the secure site to the insecure site, but the compromised state of the secure site cannot be informed to the insecure site or IT site.

SUMMARY

Accordingly, the present disclosure is directed to a communication system and a communication method for reporting a compromised state in one-way transmission. The present disclosure may protect the transmitting side and the receiving side of the one-way transmission.

The present invention is directed to a communication system for reporting a compromised state in one-way transmission. The communication system includes a receiving server and a communication device, wherein the communication device includes a first port, an error checking circuit, a data inspection circuit, a first unidirectional coupler, and a second unidirectional coupler. The first port receives a packet. The error checking circuit coupled to the first port, wherein the error checking circuit checks a header of the packet. The data inspection circuit coupled to the first port and the error checking circuit. The first unidirectional coupler coupled to the first port and the error checking circuit. The second unidirectional coupler coupled to the first port and the error checking circuit, wherein the error checking circuit disables the first unidirectional coupler and the data inspection circuit in response to an error being in the header. The receiving server receives the packet from the first directional coupler and outputs the compromised state in response to determining the received packet incomplete.

In one exemplary embodiment of the present invention, the error checking circuit disables the second unidirectional coupler and the data inspection circuit and enables the first unidirectional coupler according to an indication in the header.

In one exemplary embodiment of the present invention, the indication indicating that the packet is encrypted.

In one exemplary embodiment of the present invention, the data inspection circuit inspects whether data of the packet is correct in response to the packet is not encrypted.

In one exemplary embodiment of the present invention, the data inspection circuit inspects whether data of the packet is correct in response to the error not being in the header.

In one exemplary embodiment of the present invention, the data inspection circuit is coupled to the first unidirectional coupler and the second unidirectional coupler, wherein the data inspection circuit disables the first unidirectional coupler and enables the second unidirectional coupler in response to the data is incorrect.

In one exemplary embodiment of the present invention, the data inspection circuit enables the first unidirectional coupler and disables the second unidirectional coupler in response to the data is correct.

In one exemplary embodiment of the present invention, the header is received earlier than the data.

In one exemplary embodiment of the present invention, the error checking circuit checks whether the error is existed by performing a checksum for the header.

In one exemplary embodiment of the present invention, the data inspection circuit inspects whether the data is correct according to inspection rules associated with at least one of the followings: an object number, a data type, a data value, a time interval, and an Internet protocol address.

In one exemplary embodiment of the present invention, the data inspection circuit locates an address of the data in the packet according to the object number.

In one exemplary embodiment of the present invention, the communication device further including a second port and a third port. The second port coupled to the first unidirectional coupler. The third port coupled to the second unidirectional coupler.

In one exemplary embodiment of the present invention, the data is forwarded through one of the second port and the third port completely in a cut-through manner.

In one exemplary embodiment of the present invention, the first unidirectional coupler and the second unidirectional coupler are enabled before the error checking circuit checks the header.

The present invention is directed to a communication method for reporting a compromised state in one-way transmission, wherein the communication method is suitable for a communication device and a receiving server. The communication method includes: receiving a packet by a first port of the communication device; coupling an error checking circuit of the communication device to the first port, wherein the error checking circuit checks a header of the packet; coupling a data inspection circuit of the communication device to the first port and the error checking circuit, coupling a first unidirectional coupler of the communication device to the first port and the error checking circuit, and coupling a second unidirectional coupler of the communication device to the first port and the error checking circuit; in response to an error being in the header, disabling the first unidirectional coupler and the data inspection circuit and enabling the second unidirectional coupler by the error checking circuit; receiving the packet from the first directional coupler by the receiving server; and in response to determining the received packet is incomplete by the receiving server, outputting the compromised state by the receiving server.

In view of foregoing, the communication system of the present invention may detect the compromised states in the sender site of the one-way transmission and report the compromised states from the communication device and the receiving server in a redundant way. If a one-way link is used for performing data transmission from a secure site to an unsecure site, the communication system may report the compromised state of the secure site to the unsecure site. If a one-way link is used for performing data transmission from an unsecure site to a secure site, the communication may report the compromised state of the unsecure site to the secure site. To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the disclosure more comprehensible, several embodiments are described below as examples of implementation of the disclosure. Moreover, elements/components/steps with the same reference numerals are used to represent identical or similar parts in the figures and embodiments where appropriate.

Figure 1:
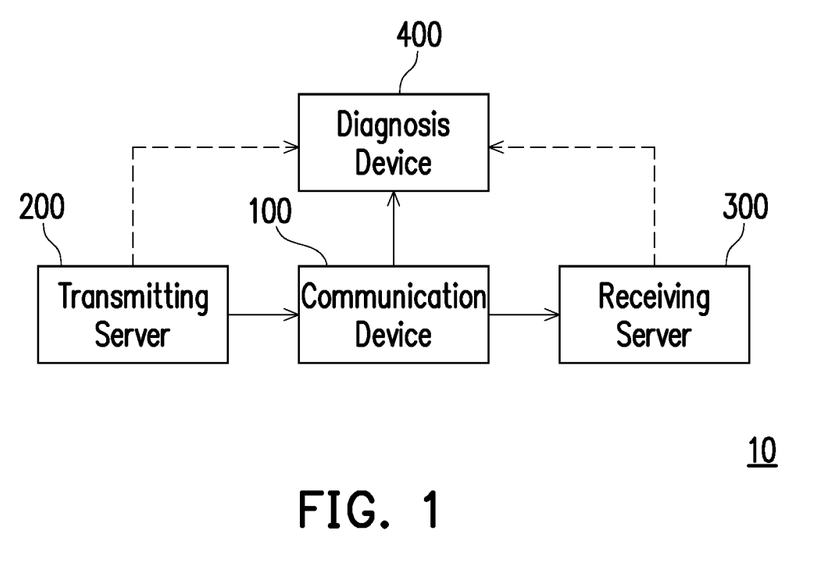
FIG. 1 illustrates a schematic diagram of a communication system for reporting a compromised state in one-way transmission according to an embodiment of the disclosure.

FIG. 1 illustrates a schematic diagram of a communication system 10 for reporting a compromised state in one-way transmission according to an embodiment of the disclosure. The communication system 10 may include a communication device 100 and a receiving server 300. In one embodiment, the communication system 10 may further include a transmitting server 200 and a diagnosis device 400. The communication device 100 may communicatively connect to the transmitting server 200, the receiving 300, or the diagnosis device 400 respectively. The communication device 100 may perform one-way transmission for the transmitting server 200 and the receiving server 300. That is, a packet from the transmitting server 200 may be forwarded to the receiving server 300 by the communication device 100. However, a packet from the receiving server 300 cannot be forwarded to the transmitting server 200 by the communication device 100.

After receiving a packet from the transmitting server 200, the communication device 100 may determine whether to forward the packet to the receiving server 300. If the communication device 100 determines to forward the packet to the receiving server 300, the receiving server 300 may receive the complete packet. The diagnosis device 400 may receive an incomplete packet. Only one of the receiving server 300 and the diagnosis device 400 may receive the complete packet transmitted by the transmitting server 200. The packet from the transmitting server 200 may be forwarded through one of the port 320 and the port 330 completely in "cut-through" manner. The "cut-through" manner may guarantee line speed of the one-way transmission without latency. The diagnosis device 400 may determine that the packet forwarded by the communication device 100 does not require further diagnostic since the received packet is incomplete. If the communication device 100 determines not to forward the packet to the receiving server 300, the receiving server 300 may receive an incomplete packet and the diagnosis device 400 may receive the complete packet. The receiving server 300 may determine that the packet forward by the communication device 100 is abnormal since the received packet is incomplete. The receiving server 300 may output a compromised state in response to determining the received packet is incomplete. On the other hand, the diagnosis device 400 may diagnose the received packet and may generate a diagnosis result accordingly. In one embodiment, the diagnosis device 400 may output a compromised state according to the diagnosis result.

The diagnosis device 400 may be a security operation center (SOC) or may be communicatively connected to the SOC. The diagnosis device 400 may communicatively connect to the communication device 100, the transmitting server 200, and the receiving server 300. If one of the communication device 100, the transmitting server 200, and the receiving server 300 finds out that an error is existed in a packet, the one may notify the diagnosis device 400 by transmitting the compromised state to the diagnosis device 400. Accordingly, a redundant path to the SOC can be established, wherein the redundant path may be used for error notification. For example, if error counts in the receiving side are above a pre-defined threshold, the receiving server 300 may notify the diagnosis device 400 by transmitting the compromised state. The diagnosis device 400 may receive a packet from the communication device 100 and may store the received packet in a safe area so as to prevent the packet from being access by anyone.

The transmitting server 200 (or receiving server 300, diagnosis device 400) may be, for example, an advanced mobile station (AMS), a desktop computer, a notebook computer, a network computer, a workstation, a personal digital assistant (PDA), a personal computer (PC), a tablet, or a phone device. The transmitting server 200 (or receiving server 300, diagnosis device 400) may include a processor, a storage medium, and a transceiver for performing functions of the transmitting server 200 (or receiving server 300, diagnosis device 400).

The processor may be a central processing unit (CPU), a micro control unit (MCU), a microprocessor, a digital signal processor (DSP), a programmable logic controller (PLC), an application specific integrated circuit (ASIC), a graphics processing unit (GPU), an image signal processor (ISP), an image processing unit (IPU), an arithmetic logic unit (ALU), a complex programmable logic device (CPLD), a FPGA, or other similar components or a combination of the foregoing components. The processor may be coupled to the storage medium and the transceiver, and the processor may access and execute a plurality of modules or programs stored in the storage medium.

The storage medium may be a random access memory (RAM), a read-only memory (ROM), a flash memory, a hard disk drive (HDD), a solid state drive (SSD), or similar components or a combination of the foregoing components. The storage medium may store a plurality of modules or programs for the processor to access, so that the processor can perform various functions of the transmitting server 200 (or receiving server 300, diagnosis device 400).

The transceiver may transmit or receive signal for communication. Communication protocols supported by the transceiver may include Ethernet, Wi-Fi, Bluetooth, ZigBee, serial communication, Internet protocol (e.g., TCP/IP protocol), or a user datagram protocol (UDP), but the present invention is not limited thereto.

Figure 2:
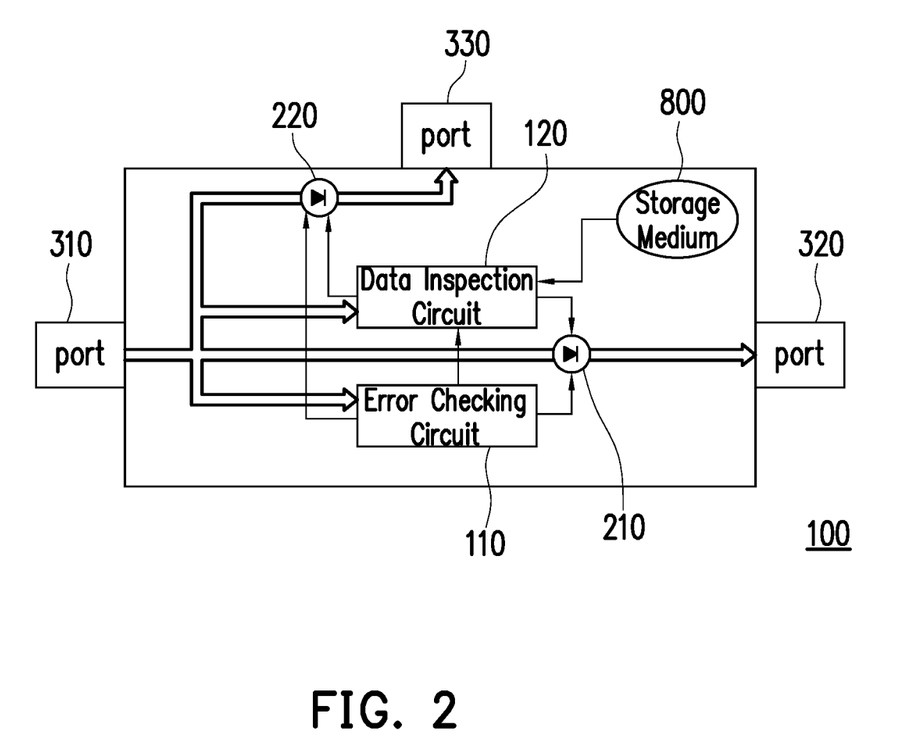
FIG. 2 illustrates a schematic diagram of the communication device for one-way transmission according to an embodiment of the disclosure.

FIG. 2 illustrates a schematic diagram of the communication device 100 for one-way transmission according to an embodiment of the disclosure. The communication device 100 may include an error checking circuit 110, a data inspection circuit 120, a unidirectional coupler 210 (also known as "first unidirectional coupler"), a unidirectional coupler 220 (also known as "second unidirectional coupler"), a port 310 (also known as "first port"), a port 320 (also known as "second port"), and a port 330 (also known as "third port"). The communication device 100 may communicatively connect to the transmitting server 200 through the port 310, may communicatively connect to the receiving server 300 through the port 320, and may communicatively connect to the diagnosis device 400 through the port 330. The port 310, the port 320, or the port 330 may be a physical layer (PHY) port. The communication device 100 may receive a packet from the transmitting server 200 through the port 310. The communication device 100 may forward the packet to the receiving server 300 through the port 320 and the unidirectional coupler 210 or the communication device 100 may forward the packet to the diagnosis device 400 through the port 330 and the unidirectional 220.

The error checking circuit 110 may be coupled to the data inspection circuit 120, the unidirectional coupler 210, the unidirectional coupler 220, or the port 310. The data inspection circuit 120 may be coupled to the error checking circuit 110, the unidirectional coupler 210, the unidirectional coupler 220, or the port 310. The unidirectional coupler 210 may be coupled to the error checking circuit 110, the data inspection circuit 120, the port 310, or the port 320. The unidirectional coupler 220 may be coupled to the error checking circuit 110, the data inspection circuit 120, the port 310, or the port 330.

The unidirectional coupler 210 or the unidirectional coupler 220 may be enabled or disabled by the error checking circuit 110 or the data inspection circuit 210. When the unidirectional coupler (e.g., unidirectional coupler 210 or 220) is enabled, a packet may be forwarded through the unidirectional coupler in one direction. When the unidirectional coupler is disabled, no packet may be forwarded through the unidirectional coupler. The unidirectional coupler 210 or the unidirectional coupler 220 may be implemented by a diode, a switch, an optical coupler, or a transistor, the present invention is not limited thereto.

Figure 3:
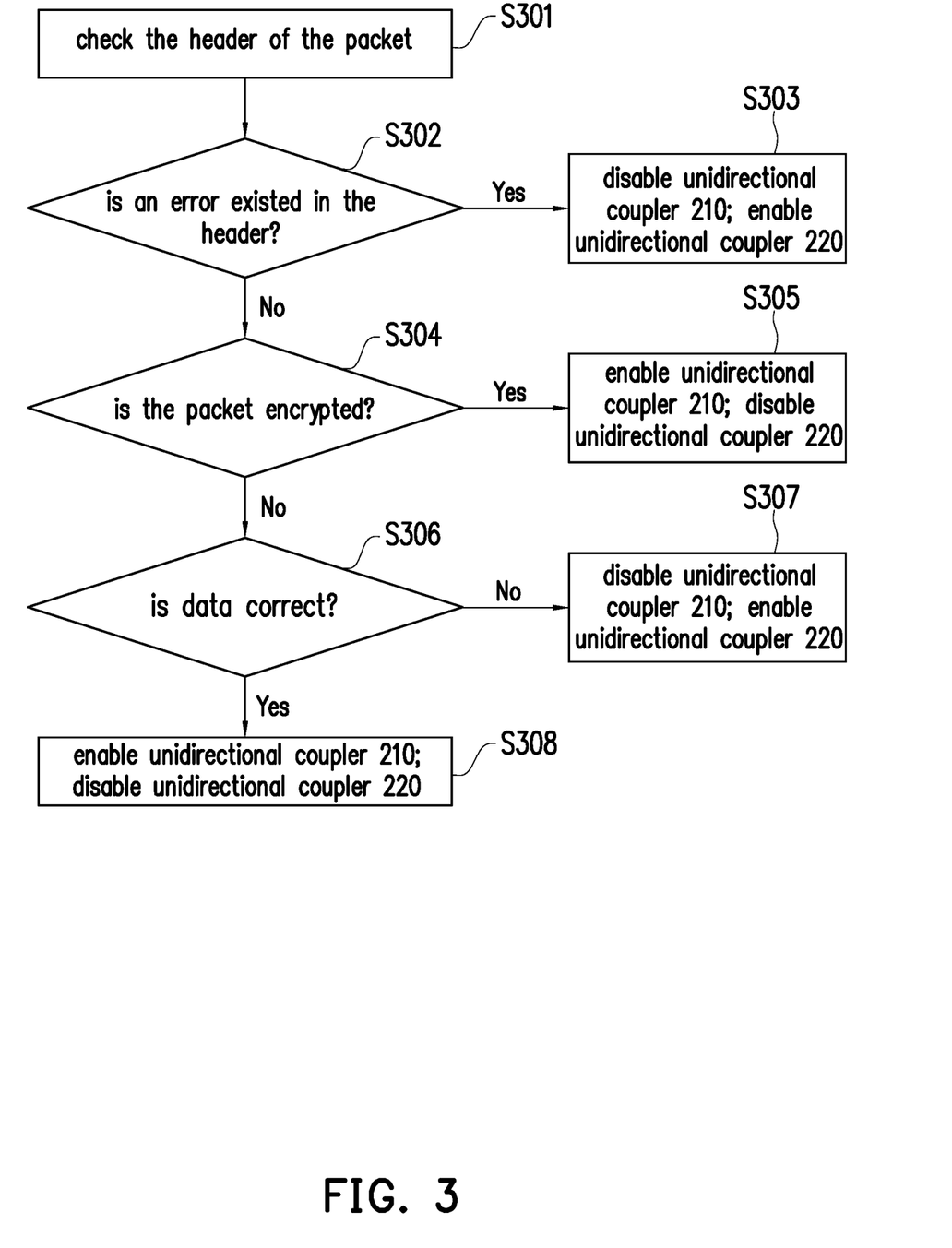
FIG. 3 illustrates a flowchart of a communication method for one-way transmission according to an embodiment of the disclosure.

FIG. 3 illustrates a flowchart of a communication method for one-way transmission according to an embodiment of the disclosure, wherein the communication method may be implemented by the communication device 100 as shown in FIG. 1.

Figure 4:
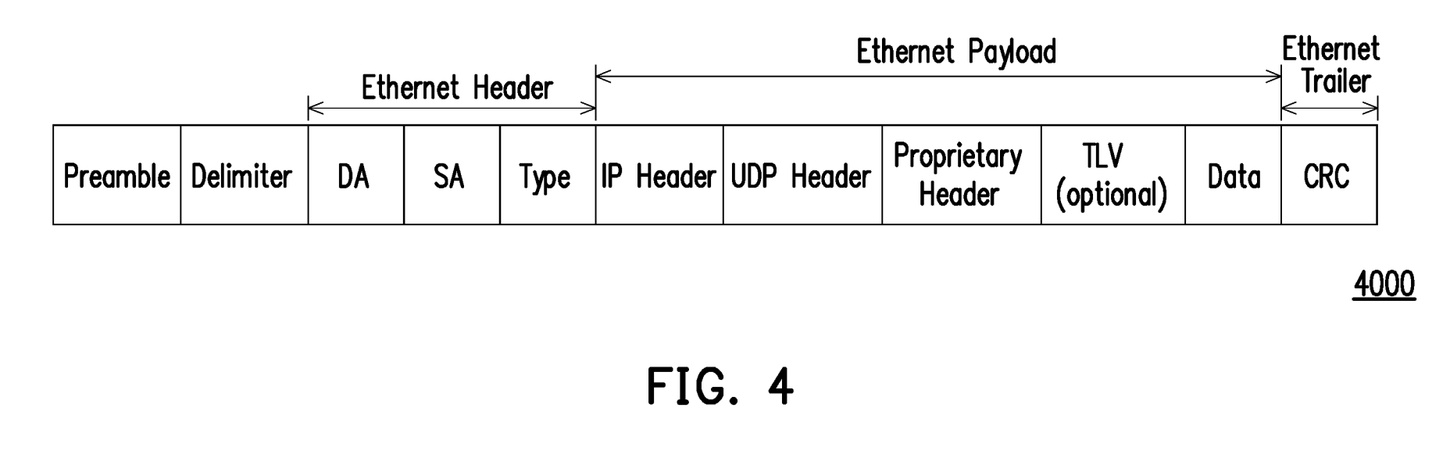
FIG. 4 illustrates a schematic diagram of a packet format of the packet according to an embodiment of the disclosure.
Figure 5:
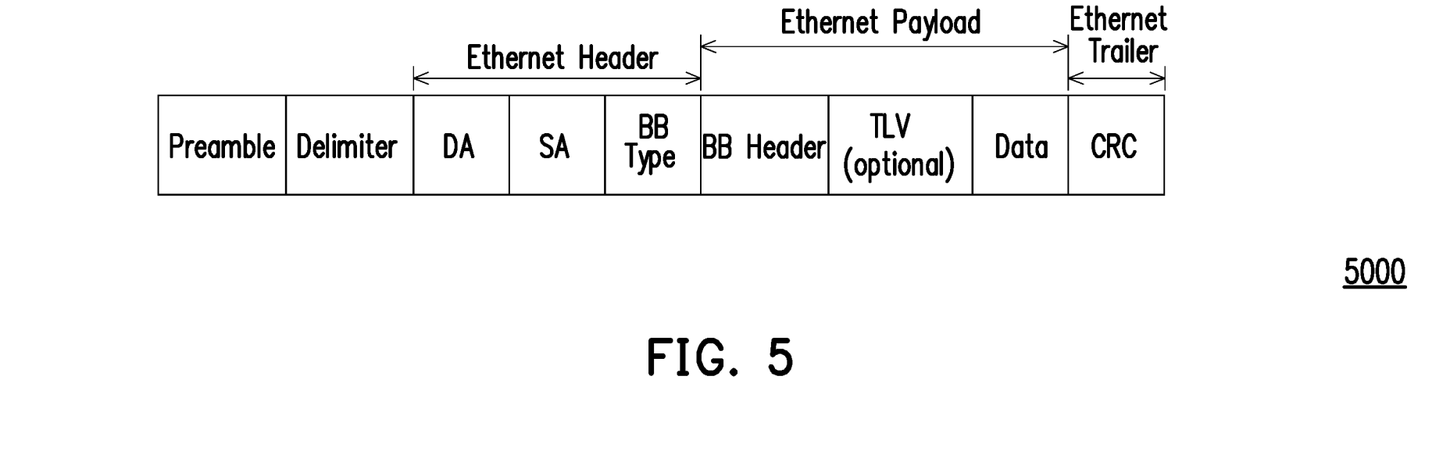
FIG. 5 illustrates a schematic diagram of a packet format of the packet according to an embodiment of the disclosure.

In step S301, the port 310 may receive a packet. The error checking circuit 110 may check the header of the packet, wherein the header may be the proprietary header as shown in FIG. 4 or may be the BB header as shown in FIG. 5. The unidirectional coupler 210 and the unidirectional coupler 220 may be enabled before the error checking circuit 110 checks the header. The packet may be packed in packet format 4000 as shown in FIG. 4 or in packet format 5000 as shown in FIG. 5. In the packet, similar data of different protocols may be mapped to adjacent address area in the packet. For example, data of "Modbus function 1, 2 address" protocol, data of "DNP3 Group 1, variant 1" protocol, and data of "IEC 60870-5-104 data type M_SP_NA_1" protocol may be mapped to adjacent address area in the packet since all of those data are single bit data. It should be noted that the unidirectional coupler 210 and the unidirectional coupler 220 are enabled initially. Therefore, the packet from the port 310 may be outputted to the port 320 and the port 330 in "cut-through" manner.

FIG. 4 illustrates a schematic diagram of a packet format 4000 of the packet according to an embodiment of the disclosure. The packet format 4000 may be corresponded to an Ethernet packet format such as UDP, wherein field "DA" may include a destination MAC address, field "SA" may include a source MAC address, field "Type" may include an Ether type (e.g., 0x0800 for IP packet or 0x8100 for IEEE 802.1Q), and field "CRC" may include a cyclic redundancy check (CRC) code. A proprietary header may be configured in the payload of the packet format 4000, wherein the proprietary header may include an encryption method (e.g., AES encryption), an indication indicating whether the packet is encrypted or not, a Hash method, a system time stamp, a total size of data, a packet size, a starting sequence number, or a checksum code corresponding to the proprietary header. The type-length-value (TLV) frame in the packet may store a Hash value of data or a destination file name. In one embodiment, the packet corresponding to the packet format 4000 may include device information such as IP address. When a packet of the packet format 4000 is received by the communication device 100 in "cut-through" manner, the proprietary header of the packet would be received earlier than the data frame of the packet.

FIG. 5 illustrates a schematic diagram of a packet format 5000 of the packet according to an embodiment of the disclosure. The packet format 5000 may be corresponded to an Ethernet packet format in data link layer, wherein field "DA" may include a destination MAC address, field "SA" may include a source MAC address, field "BB Type" may include an special Ether type (e.g., 0x0800 for IP packet or 0x8100 for IEEE 802.1Q), and field "CRC" may include a cyclic redundancy check (CRC) code. A BlackBear (BB) header may be configured in the payload of the packet format 5000, wherein the BB header may include an encryption method (e.g., AES encryption), an indication indicating whether the packet is encrypted or not, a Hash method, a system time stamp, a total size of data, a packet size, a starting sequence number, or a checksum code corresponding to the BB header. The TLV frame in the packet may store a Hash value of data or a destination file name. In one embodiment, the packet corresponding to the packet format 5000 may include device information such as IP address. When a packet of the packet format 5000 is received by the communication device 100 in "cut-through" manner, the BB header of the packet would be received earlier than the data frame of the packet.

The packet format 4000 or the packet format 5000 may be configured to a device in off-line mode. For example, the communication device 100 may receive a configuration of the packet format from the transmitting server 200. The receiving server 300 or the diagnosis device 400 may receive the configuration from of the packet format from the communication device 100.

Referring back to FIG. 3, in step S302, the error checking circuit 110 may determine whether an error is existed in the header of the packet. If an error is existed in the header, proceed to step S303. If no error is existed in the header, proceed to step S304. Specifically, the error checking circuit 110 may perform a checksum for the header so as to determine whether an error is existed in the header. The error checking circuit 110 may perform the checksum for the header according to a checksum code corresponding to the header (e.g., proprietary header or BB header).

In step S303, the error checking circuit 110 may disable the unidirectional coupler 210 and enable the unidirectional coupler 220. Accordingly, the port 320 may output an incomplete packet and the port 330 may output a complete packet. The diagnosis device 400 may receive the complete packet from the port 330. A diagnosis for the packet may be performed by the diagnosis device 400.

In step S304, the error checking circuit 110 may determine whether the packet is encrypted or not. If the packet is encrypted, proceed to step S305. If the packet is not encrypted, proceed to step S306. Specifically, the error checking circuit 110 may detect if an indication is in the header or not, wherein the indication indicating that the packet is encrypted. If the indication is in the header, the error checking circuit 110 may determine that the packet is encrypted. If the indication is not in the header, the error checking circuit 110 may determine that the packet is not encrypted.

In step S305, the error checking circuit 110 may enable the unidirectional coupler 210 and may disable the unidirectional coupler 220. Accordingly, the port 320 may output a complete packet and the port 330 may output an incomplete packet. In other words, if the packet is encrypted, the communication device 100 may output the complete packet via the port 320 without checking the whole packet. In one embodiment, the error checking circuit 110 may disable the data inspection circuit 120 so as to save power consumption.

In step S306, the data inspection circuit 120 may inspect whether the data of the packet is correct or not. If the data is correct, proceed to step S308. If the data is incorrect, proceed to step S307. In one embodiment, the data inspection circuit 120 may inspect whether the data is correct according to inspection rules. Specifically, the communication device 100 may include a storage medium 800, wherein the storage medium 800 may be coupled to the data inspection circuit 120. The storage medium 800 may store the inspection rules. The inspection rules may include an object number, a data type, a data value, a time interval, or an IP address, the present invention is not limited thereto. The data inspection circuit 120 may locate an address of the data in the packet according to the object number.

The storage medium 800 is, for example, a random access memory (RAM), a read-only memory (ROM), a flash memory, a hard disk drive (HDD), a hard disk drive (HDD), a solid state drive (SSD) or other similar elements in any stationary or movable form, or a combination of the above-mentioned elements.

In step S307, the data inspection circuit 120 may disable the unidirectional coupler 210 and may enable the unidirectional coupler 220. Accordingly, the port 320 may output an incomplete packet and the port 330 may output a complete packet.

In step S308, the data inspection circuit 120 may enable the unidirectional coupler 210 and may disable the unidirectional coupler 220. Accordingly, the port 320 may output a complete packet and the port 330 may output an incomplete packet.

Figure 6:
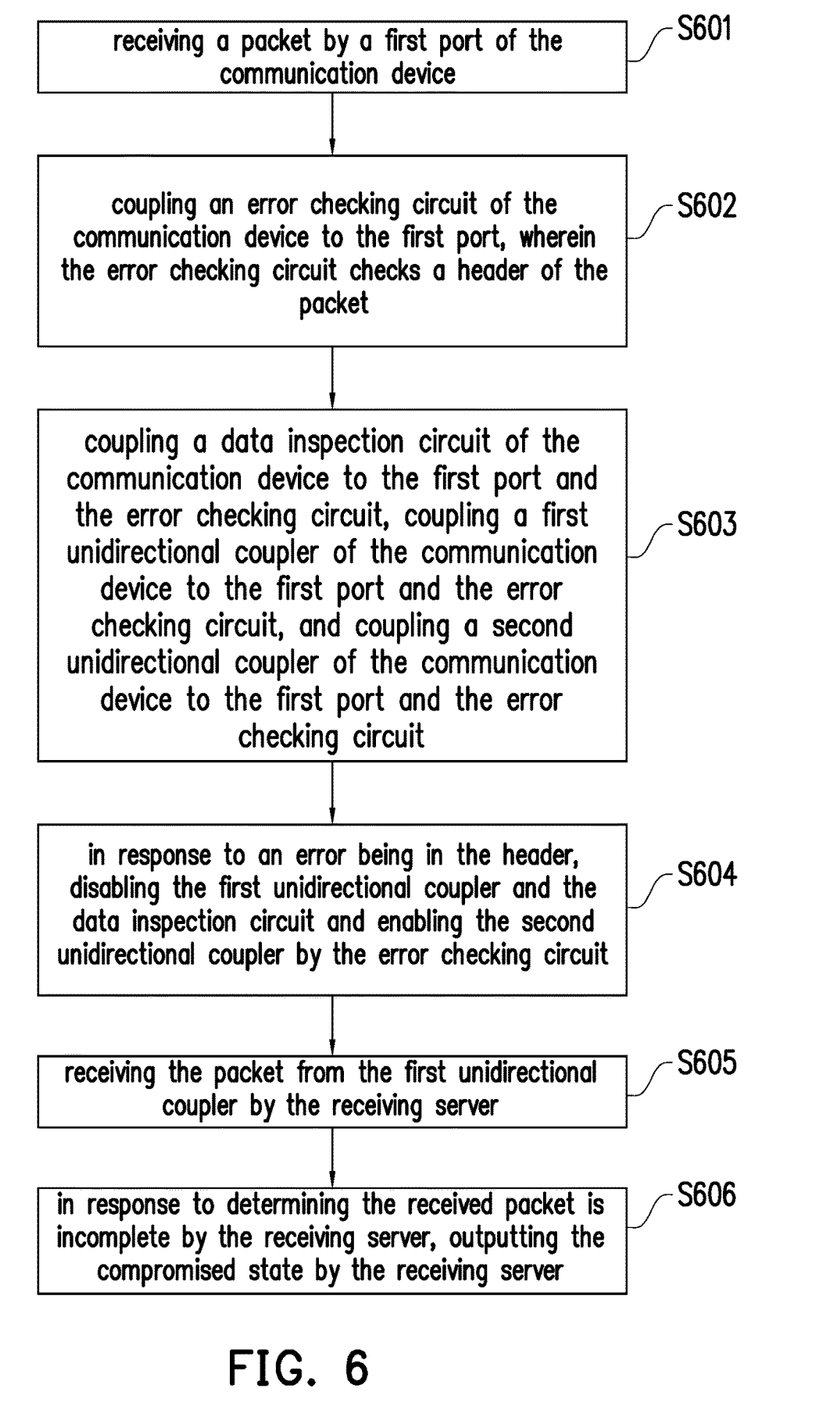
FIG. 6 illustrates a flowchart of a communication method for reporting a compromised state in one-way transmission according to an embodiment of the disclosure.

FIG. 6 illustrates a flowchart of a communication method for reporting a compromised state in one-way transmission according to an embodiment of the disclosure, wherein the communication method may be implemented by the communication device 100 and the receiving server 200 as shown in FIG. 1. In step S601, receiving a packet by a first port of the communication device. In step S602, coupling an error checking circuit of the communication device to the first port, wherein the error checking circuit checks a header of the packet. In step S603, coupling a data inspection circuit of the communication device to the first port and the error checking circuit, coupling a first unidirectional coupler of the communication device to the first port and the error checking circuit, and coupling a second unidirectional coupler of the communication device to the first port and the error checking circuit. In step S604, in response to an error being in the header, disabling the first unidirectional coupler and the data inspection circuit and enabling the second unidirectional coupler by the error checking circuit. In step S605, receiving the packet from the first unidirectional coupler by the receiving server. In step S606, in response to determining the received packet is incomplete by the receiving server, outputting the compromised state by the receiving server.

In summary, the communication system of the present invention may report the compromised states in the transmitting side of the one-way transmission in a redundant way. The communication device may determine whether to forward the packet from the transmitting side to the receiving side according to the header of the packet. If an error in the packet is been discovered, the communication device may determine not to forward the complete packet to the receiving side. Otherwise, the communication device may determine to forward the complete packet to the receiving side. If the communication device determines not to forward the complete packet to the receiving side, the receiving side will receive an incomplete packet from the communication device. Since the received packet is incomplete, the receiving side may determine to discard the received packet and may report a compromised state according to the received packet. On the other hand, if the communication device determines to forward the complete packet to the receiving side, a diagnosis device may receive an incomplete packet from the communication device. Since the received packet is incomplete, the diagnosis device may determine that the one-way transmission is successful. Thus, an analysis for the packet is not required.

Based on the present invention, the communication system may generalize all the data packets with similar protocols to have similar format according general rules which may easily applied by FPGA devices. The present invention proposes a method to inform the receiving site that some abnormal packets try to pass through the one-way link. The receiving side may determine whether to report the compromised states according to the error count corresponding to the compromised packets passing through the one-way link. At the same time, the packets filtered by the communication device may be forwarded to the diagnosis device for further analysis. At least one of the diagnosis device and the receiving server may inform the SOC about the compromised states.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication system for reporting a compromised state in one-way transmission, comprising:
    a receiving server, and
    a communication device communicatively connected to the receiving server, wherein the communication device comprising:
        a first port, receives a packet;
        an error checking circuit coupled to the first port, wherein the error checking circuit checks a header of the packet;
        a data inspection circuit coupled to the first port and the error checking circuit;
        a first unidirectional coupler coupled to the first port and the error checking circuit; and
        a second unidirectional coupler coupled to the first port and the error checking circuit, wherein the error checking circuit disables the first unidirectional coupler and the data inspection circuit and enables the second unidirectional coupler in response to an error being in the header, wherein
        the receiving server receives the packet incompletely from the first unidirectional coupler in response to the first directional coupler being disabled and outputs the compromised state in response to determining the received packet incomplete, wherein
        the data inspection circuit inspects whether data of the packet is correct in response to the error not being in the header, wherein
        the data inspection circuit is coupled to the first unidirectional coupler and the second unidirectional coupler, wherein the data inspection circuit disables the first unidirectional coupler and enables the second unidirectional coupler in response to the data being incorrect.

2. The communication system according to claim 1, wherein the error checking circuit disables the second unidirectional coupler and the data inspection circuit and enables the first unidirectional coupler according to an indication in the header.

3. The communication system according to claim 2, wherein the indication indicating that the packet is encrypted.

4. The communication system according to claim 2, wherein the data inspection circuit inspects whether data of the packet is correct in response to the packet is not encrypted.

5. The communication system according to claim 1, wherein the data inspection circuit enables the first unidirectional coupler and disables the second unidirectional coupler in response to the data is correct.

6. The communication system according to claim 1, wherein the header is received earlier than the data.

7. The communication system according to claim 1, wherein the error checking circuit checks whether the error is existed by performing a checksum for the header.

8. The communication system according to claim 1, wherein the data inspection circuit inspects whether the data is correct according to inspection rules associated with at least one of the followings:
    an object number, a data type, a data value, a time interval, and an Internet protocol address.

9. The communication system according to claim 8, wherein the data inspection circuit locates an address of the data in the packet according to the object number.

10. The communication system according to claim 1, wherein the communication device further comprising:
    a second port coupled to the first unidirectional coupler; and
    a third port coupled to the second unidirectional coupler.

11. The communication system according to claim 10, wherein the data is forwarded through one of the second port and the third port completely in a cut-through manner.

12. The communication system according to claim 1, wherein the first unidirectional coupler and the second unidirectional coupler are enabled before the error checking circuit checks the header.

13. A communication method for reporting a compromised state in one-way transmission, suitable for a communication device and a receiving server, wherein the communication method comprising:
    receiving a packet by a first port of the communication device;
    coupling an error checking circuit of the communication device to the first port, wherein the error checking circuit checks a header of the packet;
    coupling a data inspection circuit of the communication device to the first port and the error checking circuit, coupling a first unidirectional coupler of the communication device to the first port and the error checking circuit, and coupling a second unidirectional coupler of the communication device to the first port and the error checking circuit;
    in response to an error being in the header, disabling the first unidirectional coupler and the data inspection circuit and enabling the second unidirectional coupler by the error checking circuit;
    coupling the data inspection circuit to the first unidirectional coupler and the second unidirectional coupler;

inspecting whether data of the packet is correct by the data inspection circuit in response to the error not being in the header;

disabling the first unidirectional coupler and enabling the second unidirectional coupler by the data inspection circuit in response to the data being incorrect;

receiving the packet incompletely from the first unidirectional coupler by the receiving server in response to the first directional coupler being disabled; and in response to determining the received packet is incomplete by the receiving server, outputting the compromised state by the receiving server.

\* \* \* \* \*